Sept. 22, 1936.     A. W. CARPENTER     2,055,118
MOTION PICTURE STEREOSCOPY
Filed Sept. 25, 1933     4 Sheets-Sheet 1
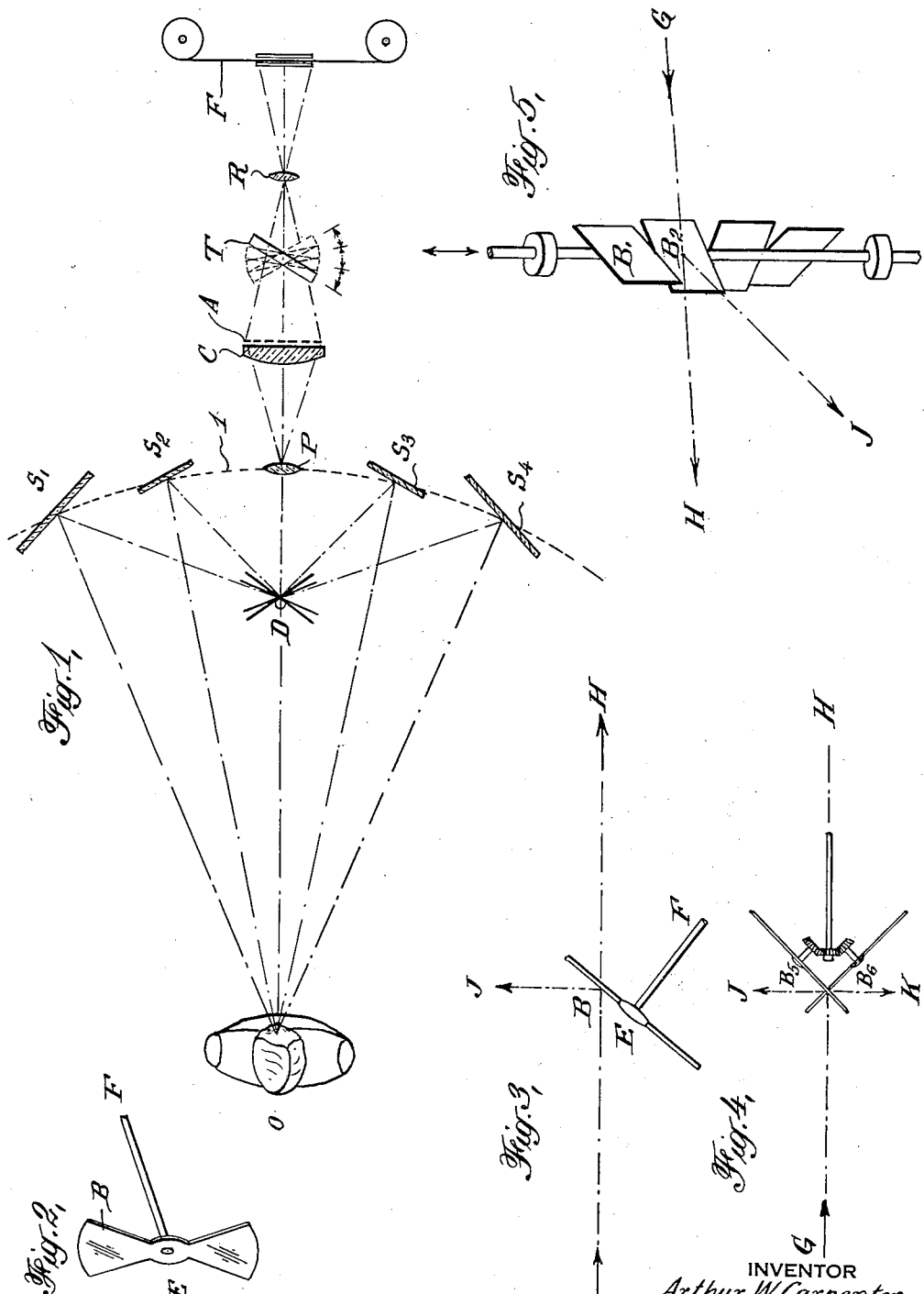
INVENTOR
Arthur W. Carpenter
BY
W E Bratt
ATTORNEY

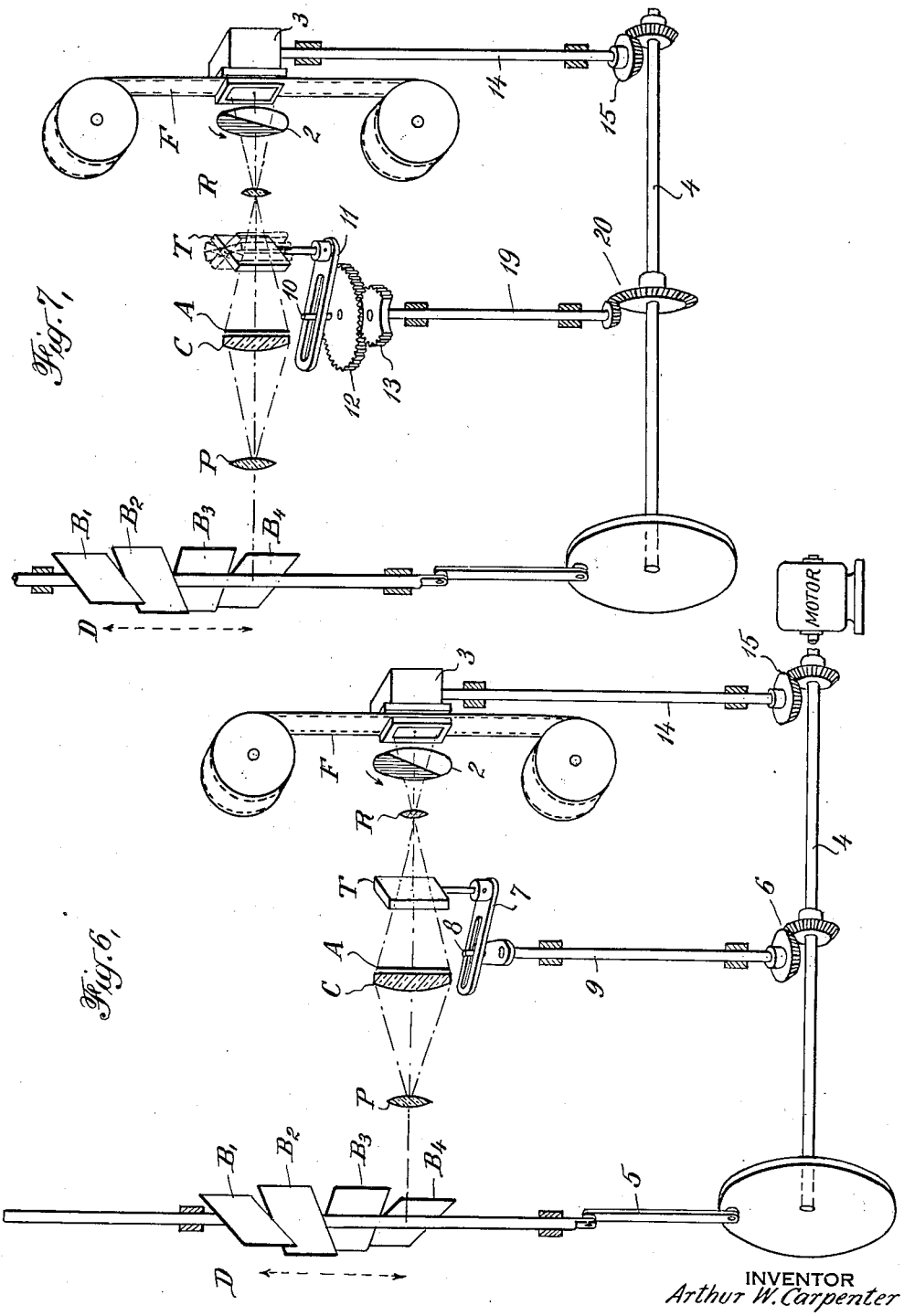

Sept. 22, 1936.  A. W. CARPENTER  2,055,118
MOTION PICTURE STEREOSCOPY
Filed Sept. 25, 1933  4 Sheets-Sheet 3

INVENTOR
Arthur W. Carpenter
BY
ATTORNEY

Sept. 22, 1936.  A. W. CARPENTER  2,055,118
MOTION PICTURE STEREOSCOPY
Filed Sept. 25, 1933  4 Sheets-Sheet 4
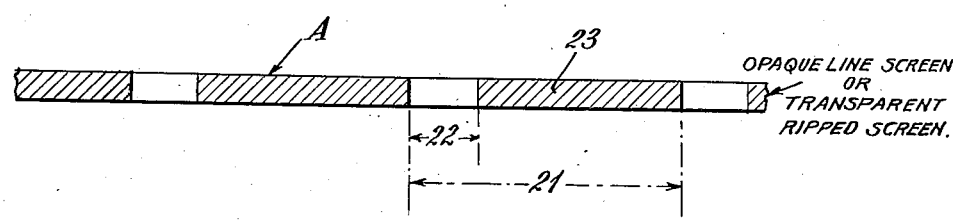
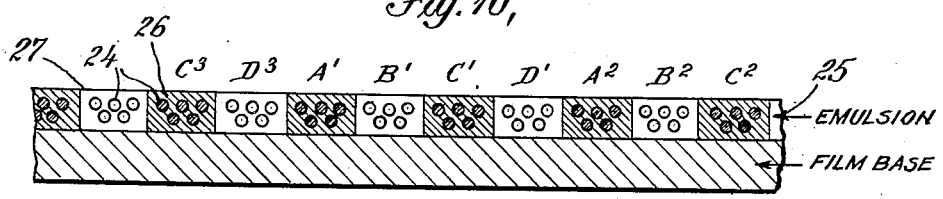
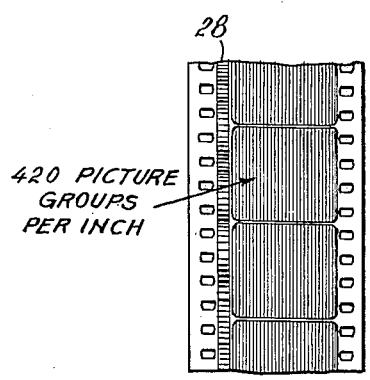
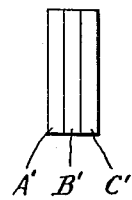
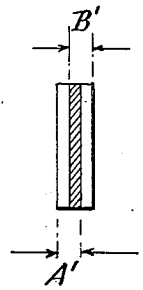
INVENTOR
Arthur W. Carpenter
BY
ATTORNEY Patented Sept. 22, 1936

2,055,118

UNITED STATES PATENT OFFICE 2,055,118

MOTION PICTURE STEREOSCOPY

Arthur W. Carpenter, New York, N. Y., assignor to United Research Corporation, Long Island City, N. Y., a corporation of Delaware Application September 25, 1933, Serial No. 690,830

2 Claims. (Cl. 88—16.6)

The invention relates to the method and means for obtaining stereoscopic motion pictures of the type known as "Interlined parallax stereopanoramagrams."

In my copending application S. N. 688,794 filed September 9, 1933 for "Stereoscopy", I have disclosed and claimed a stereogram, also method and means for obtaining the same, wherein the number of picture line elements is in definite relation to the resolving power of the film or other light sensitive surfaces. In that case the object is photographed from a number of discrete view points such as several stationary camera positions, the optical path between the object and the sensitive surface being shifted between exposures to traverse the picture line elements across the sensitive surface. As each picture line element is formed with the camera in a fixed position, each such line element, or what I designate a "stripe" to differentiate from the smear panoramagram of the prior art, contains a full width of unsmeared detail due to the fact that there is no internal displacement of the image.

The particular apparatus disclosed in the above mentioned copending application, while disclosing features useful in motion picture stereoscopy, does not disclose apparatus which lends itself readily to the taking of motion pictures because of the appreciable time required to move the camera into its several viewing positions.

An object of the present invention is to form an interlined parallax panoramagram wherein the picture line elements whether stripes or smears are caused to traverse, and therefore be recorded on, the light sensitive surface with a speed sufficient to permit photographing a moving object without moving the motion picture camera 24 times per second through the viewing azimuth as has been proposed by others.

This is accomplished by arranging before the object an arcuate array of station mirrors, each of which forms a reflection of the object from a different viewpoint, and in forming an interlined stereogram from the reflections thus formed.

The use of plane station mirrors is of particular advantage as they cause no distortion of the reflected images they form, which is an advantage not only in operation, but also in economy, over the spherical mirror of Kanolt #1,882,648.

The invention provides means for distributing the station mirror reflections along an optical path or paths leading to a light sensitive surface via a lineater, that is an opaque line screen or a lenticular diffusing grating or screen or the like.

In the case here illustrated, this distributing means comprises a supplemental plane mirror for each station mirror.

In the embodiment herein disclosed, the invention provides distributing mirrors which are introduced into and withdrawn from the line of sight between the stationary mirrors and the light sensitive surface, by motion in the plane of the reflecting surface. As each distributing mirror moves in its plane it causes no distortion of the image reflected thereby.

The invention provides method and means whereby a plurality of lines of sight simultaneously emanating from the object along different azimuths are brought together sequentially into coincidence so as to form one line of sight entering the photographic objective. Moving in timed relation with the distributing member is a lineater for arranging the several components of the panoram image in proper sequence within the lines of the image upon the photographically sensitive recording surface. The parts which it is thus proposed to move are comparatively light in weight.

Another object of the invention is to adapt the apparatus just described to the photographing of motion picture stereograms. This is accomplished by correlating the timed movement of the distributing member and the lineater with the pull down mechanism and shutter in the camera. For example, the distributing member and the lineater may be brought to the beginning of the cycle of their required movement for photographing, during the time that the shutter is closed and film frame being pulled down in the camera.

Another object of the invention is to avoid the necessity for placing the lineater in close relation to the light sensitive emulsion. This is accomplished by impressing on one side of the lineater, a plurality of different angular views of the object, and by arranging on the other side of the lineater, a light sensitive surface with a relay lens between the lineater and the light sensitive surface. In other words, this is accomplished by bringing to a common image plane a plurality of images of an object from different viewpoints, and by arranging a lineater at or near this image plane, and by focusing on or relaying to a light sensitive surface the images in the common image plane as lineated by said lineater.

In thus preparing a motion picture stereogram account should be taken of the following considerations which are set forth in further detail and claimed in my above mentioned co-pending application.

These considerations are namely:

1. The number of picture line elements on the film should bear a definite relation to the resolving power of the film. To this end, a small multiple of the average grain size in the emulsion such as five time the average grain width should be taken as a measure of the limit of the number of picture elements which the emulsion can render, or, in other words, the minimum pitch of the line elements of the picture.

2. Instead of endeavoring to render a smear panoramagram, or in other words an infinite number of images, in the small space available between the closely spaced adjacent lines on the film, it is desirable to lay down only a finite number such as from 3 to perhaps 12 portions in each picture group so that the number of grains in the emulsion may be able to adequately render each image portion, and to restrict each of these image portions to the image of the object as seen from a single viewpoint. Each such single viewpoint may be provided by the station mirror of this invention. Each image from a single viewpoint I designate a stripe, as above described, and these stripes may appear side by side on the film or they may overlap at their edges.

3. A definite relation should exist between the ratio of the transparent to opaque portions of the taking screen and the number of discreet viewing stations whereby the stripes, whether appearing edge to edge or whether overlapping as above described, are conjoined in each line group and the line groups are conjoined whereby the whole of the negative is exposed.

4. The angle through which the object is viewed should be taken into account and should be correlated with the grain size and the screen or line pitch by exposing the film through a lineater having a line pitch and through a viewing angle such that the adjacent line elements are of the order of, or at least five times the average width of the silver grain of the emulsion of the film and representing substantially different tone values in the object.

For further details of the invention reference may be made to the drawings, wherein:

Figure 1 is a schematic plan view of a photographing arrangement according to the present invention, and wherein two sets of plane mirrors are employed for forming different angular images of the object with station mirrors arranged on a circular arc.

Figure 2 is a perspective view and Figure 3 is a side elevation of a rotating mirror which may be used instead of the reciprocating mirror of Figure 1. Figure 4 is a modification of Figure 3. A perspective view of the reciprocating mirror in Figure 1 is shown in Figure 5.

Figure 6 is a perspective side elevation of means for operating a motion picture camera in timed relation with the movable mirrors and the image traversing member of Figure 1, and wherein the traversing member is moved during exposure of the film to produce an interlined stereogram of modified smear type. The modification consists in this:

That whereas the panoramagram of Kanolt (U. S. #1,260,682) comprises a continuous smear the width of the picture, the apparatus of Figure 6 produces four groups of smears each group recording the object as viewed from a discrete viewpoint determined by the appropriate one of the four reciprocating mirrors.

Figure 7 is a modification of Figure 6 wherein the traversing members move step by step and are held stationary during a substantial portion of the time that a part of one of the four reciprocating mirrors is in line with the film. This produces groups of stripes as disclosed and claimed in my copending application referred to above, these groups being connected by lap dissolves or smears due to the motion of the traversing member from one stationary position to another.

Figure 9 is an enlarged sectional view of a line screen.

Figure 10 is an enlarged sectional view of a film exposed to stripes in predetermined relation to the grain size of the film.

Figure 11 is a schematic view of motion picture film having a motion picture stereogram thereon according to the invention.

Figure 12 is a schematic view illustrating the stripes in edge to edge relation.

Figure 13 is a modification of Figure 11 illustrating the stripes as overlapping at their edges.

Figure 8:
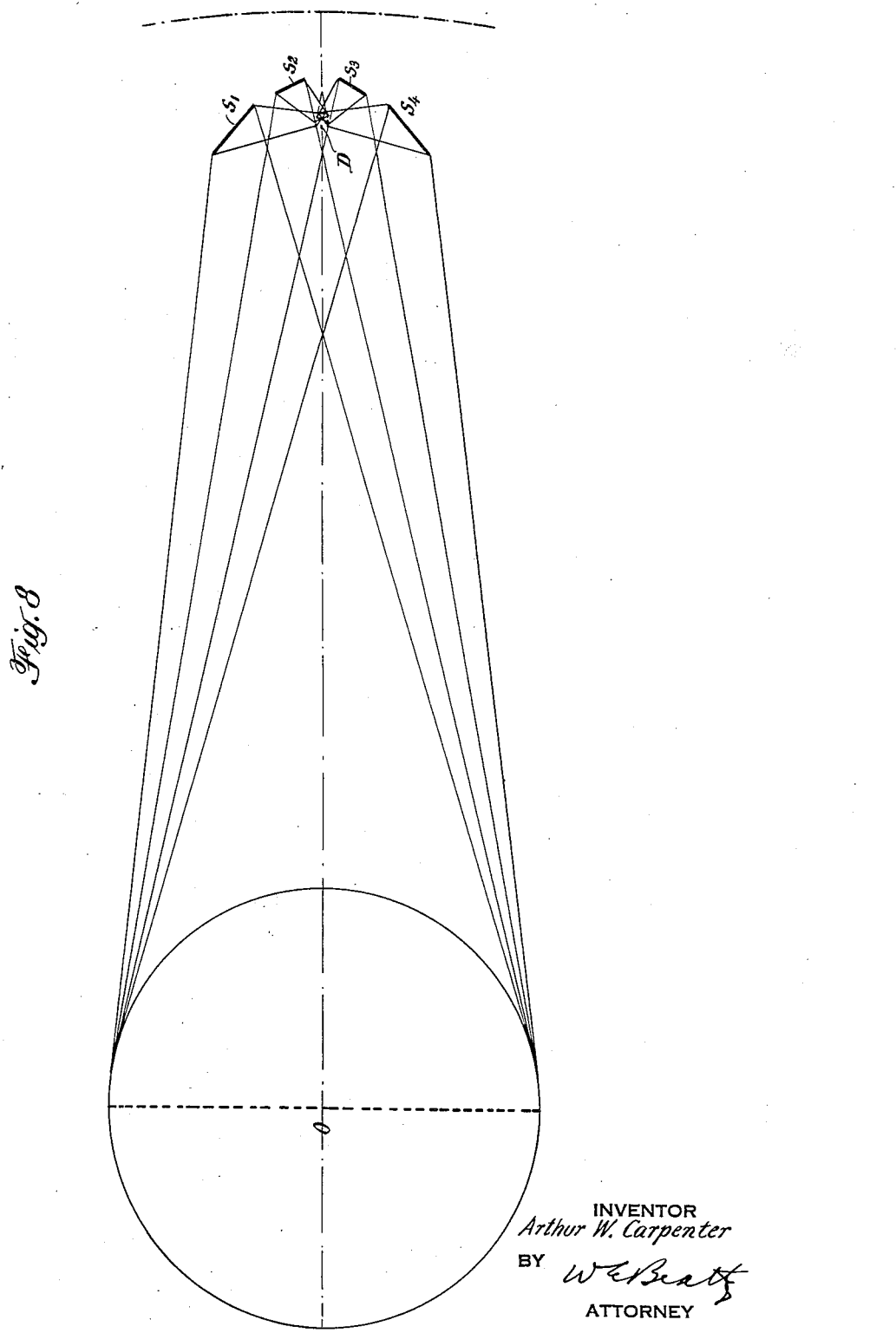
Figure 8 is a modification of Figure 1, wherein the station mirrors are arranged along a symmetrical portion of an ellipse having one focus at the distributor D and the other focus at the center of the object O.

Referring in detail to the drawings, the object O in Figure 1 is to be photographically recorded as an interlined motion picture stereogram on the light sensitive surface or motion picture film F. The object O is arranged before an arcute array of plane station mirrors S1, S2, S3, S4, which are symmetrically disposed on curve 1 about the optical axis of the apparatus as a whole. Curve 1 may be a circular arc as in Figure 1, or a conic such as an ellipse as in Figure 8. In cooperative relation to the station mirrors is a set D of distributing mirrors shown in detail in Figure 5, and comprising the four mirrors B1, B2, B3, B4. The distributing mirrors D are moved by a mechanism shown in Figures 6 and 7, to reflect, one at a time, the discrete angular images of the object in the station mirrors to the optical axis where the object lens P is arranged. Also in the optical axis is arranged the converging lens C adjacent to the lineater A. Between the lineater A and the film F is arranged a relay lens R, and between the lens R and the lineater A is arranged a traversing member T which is moved in timed relation with the distributing lens D by a mechanism shown in Figures 6 and 7.

The station mirrors S1, S2, S3, S4, are optically plane reflectors which should be preferably front surface reflectors of high quality, but which for economy may be ordinary thick back surface mirrors. These reflectors are arranged with their planes perpendicular to the equatorial plane of the object and with their central vertical axis positioned at pre-determined intervals along a symmetrical curvilinear path 1. In practice it has been found that if these station mirrors S1, S2, S3, S4, are so distributed that the extreme mirrors on either side embrace between them about 10 degrees of the azimuth of the object the most pleasing results are obtained, but it is obvious that this is a matter of choice and that fewer or more degrees may be included at will. In practice it is convenient to set these station mirrors along a circular arc having a radius of about ½ of the object distance but better practice yielding theoretically the most perfect results is to position the mirrors on a symmetrical portion of an elliptical arc of such axis that one focus of the ellipse is coincident with the center of the distributing member at "D" and the other focus of the ellipse is coincident with the center of the object O. Under certain finite conditions, it can happen that symmetrical portions of a parabolic or other conic may serve more advantageously as a base for the position of the station mirrors. In either case, each of these station mirrors S1, S2, S3, S4, is so oriented about its vertical axis as to deflect the line of sight from the object O to the center of the distributor D.

While I have shown, for purposes of illustration, four station mirrors, it is obvious that a greater or less number may be employed at will according to the circumstances of the desired use. If the number of station mirrors is reduced to as few as two then simple interlined stereograms may be produced, whereas if the number is increased to seven or more, the approximation to a theoretically consistent stereopanoramagram becomes more and more perfect. It is noted, in passing, that the further the station mirrors are from the central axis of the objective O the greater the section of the cone of sight they have to subtend and consequently it is necessary to use larger mirrors for the extreme positions than for those positions nearer to the central axis.

When the station mirrors, S1, S2, S3, S4, are arranged in the desired elliptical arc as in Figure 8 and the object O positioned as aforementioned at the other focus of the ellipse it is to be noted that the object distance measured from the object to the central axis of the array of station mirrors and thence to the distributor D is, by virtue of the well-known geometry of the ellipse, in all cases the same. From this it follows that the object distance from the objective along any line of sight of this apparatus is identical, and accordingly the several images produced by the apparatus are identical in all respects save that of viewing angle.

Coming now to the distributor D, in order to appreciate the particular features of the type of distributors which are adapted to use with this apparatus, it is desirable to consider briefly the other types of distributors of which a number have been proposed for similar service but which by reason of certain inherent characteristics are not desirable.

A large number of devices known as "partial reflectors" should be mentioned for differentiation from the devices produced for this apparatus. Partial reflectors include not only lightly silvered or platinized reflectors, but also opaque or wholly reflecting surfaces so perforated with holes or non-reflecting portions as to permit part of the beam to pass.

Another distinct class of devices includes a wide variety of whirling or revolving reflectors in which the reflecting surface is swung into and out of the line of sight on an axis of rotation which rests either in or parallel to the plane of the reflecting surface. In this group are to be found hinged mirrors and fasceted drums and such devices.

Yet, another group includes a number of refractive devices as the beam splitting member. Prisms, wedges and double refractive elements make up this group.

Each of these groups has inherent disadvantages for the purposes of this invention and it was to minimize these disadvantages that the types of distributors proposed in this application were used.

The first group of partial reflectors are very difficult to prepare and they do not permit of splitting the beam into more than two directions at any one point in its path. The second group of revolving reflectors do not permit of the instantaneous deflection of the line of sight from one position to another because the introduction and withdrawal of the reflector is along a curvilinear path in a plane perpendicular to the reflecting surface and hence the line of sight is progressively deflected through an arc which only permits the deflection to dwell momentarily upon the desired position and which conversely causes the line of sight to be in unwanted positions for the majority of the time.

The refracting devices are very difficult to construct, and they are usually of very low efficiency.

The distributors proposed in this application consist of one or more plane wholly reflecting surfaces B1, B2, B3, B4, introduced into and removed from the line of sight by motion wholly within the plane of the reflector itself. In the preferred form of this device this motion takes the form of rotation about an axis normal or perpendicular to the reflecting plane. A simple form of such a deflector is a sector shutter of one or more blades such as that shown in Figure 2, in which one face of the sectors is the reflecting plane as at "B" and the motion takes the form of rotation about the axis "EF". It is obvious that if such a deflector is so positioned, as for example in Figure 3, that its axis of rotation is in the plane of, and at an angle to, the line of sight then as the deflector is rotated and a reflecting segment of the shutter cuts across the line of sight the latter will be instantaneously deflected from its original course "GH" to a new course "GJ".

These deflectors consist of two bladed or double sector shutters and more than one such shutter B5, B6 (Fig. 4) are interlocked or synchronized to accomplish successive distribution in a variety of directions. For the purposes of distribution of the line of sight into more than one path, for example in two paths, the two double bladed sector shutters, B5, B6, each having a sector 60 degrees wide, may be interlocked by gearing their axes together at right angles in the same plane and in the plane of the equator of the station mirrors or object, with their blades engaged 90 degrees out of phase with each other. Such a combination is shown in Figure 4. This form of deflector is very desirable for the purpose of this invention in that it may be operated without vibration at high speed and with multiple sectors in the shutters the frequency with which the line of sight is distributed along its various paths may be made so high that for the practical purposes of any finite photographic exposure the disintegration of the line of sight into its several components may be said to be substantially continuous and simultaneous. It is to be noted that motion of a plane reflector in its own plane has no effect whatever upon the nature or quality of the reflected or virtual image of an object observed via that reflector so long as the plane of the reflector is continuous.

In cases where a limited number of successive deflections are desired, or where the desired rapidity of the substitution of alternative lines of sight is low enough to admit of reversing the direction of travel of the deflector then the form of deflector shown in Figure 5 may be employed in this apparatus. In this deflector in which the motion of translation is rectilinear rather than rotational, the same conditions as to the introduction and withdrawal of the reflector by motion in its own plane are complied with and the line of sight may be instantaneously deflected from one to another of the several positions in any desired sequence.

Attention should be momentarily devoted to the fact that whereas in this rectilinearly moving type of deflector the sequence of deflection may be established at will in any sequence whatever and without intervening lapse of non-deflection periods by the simple expedient of setting the deflectors at any desired azimuth about the axis of motion; in the rotational type of deflector the sequence of deflection is difficult to arrange in a heterogeneous order and customarily occurs with intervening periods of non-deflection. Furthermore, the rectilinear series of deflectors is easily reset at will, whereas the rotational series of deflectors once built must be maintained or completely re-built.

Coming now to the photographic objective "P" in Fig. 1, this may be any suitable type of photographic objective, though, because of the fact that the several component exposures are necessarily of brief duration compared to the whole exposure interval, it is desirable that this objective be chosen from among those working at "wide apertures", or in other words, objectives having high light gathering abilities.

From this objective to the photographic surface I would point out that several alternative arrangements may be employed according to the particular type of image which it is desired to obtain. For purpose of illustration I have shown one of the devices which I have used which is rather more elaborate in its construction than is always necessary. Of this first element is the converging lens "C" at the surface of which, or near which the relay image is formed by the objective P. This converging lens has for its purpose the reversal of the divergence of the image forming rays from the objective P so that the available light becomes convergent to such an extent as to be more efficiently collected by the relay lens "R".

A convenient form of converger for this position is a simple planoconvex lens of a focal length suitably adapted to the distance of the relay lens "R".

In the plane of the image formed by the objective P, or at a suitable distance before or behind it, according to the type of analysis desired, or in other words, the sequence order of the station views within individual lines of the image which may be desired, is positioned a suitable lineater "A". In Figure 1, I have shown this lineater as a simple line screen consisting of opaque vertical rulings with transparent spaces. A fixed lineater of this nature requires in association with it, either an optical displacer such as is shown at "T", or else some alternative means of displacing the image, such as a mechanism for causing a lateral traverse of the relay lens shown at "R". In lieu of this displacing of the traversing member T, the analyzing screen A itself may obviously be traversed laterally. Or again, alternative forms of lineaters may be introduced at "A" which are self-distributing as to the component images and need no associated traversing members.

At "T" I have shown a convenient form of optical displacer for causing apparent traverse of the lineater as imaged by the relay lens R on the photographic surface F. This displacer T consists simply of a plane parallel transparent plate positioned transversely to the axis of the lenses P, C, R, and caused to rotate or oscillate about a vertical axis parallel to the lines of the lineater A. It will be evident that any deviation of this plate T from a position normal to the axis of the lenses P, C, R, will cause a slight, but proportionate apparent displacement in the lateral position of the screen A as viewed from the relay lens R or photo-sensitive surface F. The relay lens shown at "R" may be any suitable lens though preferably of good photographic quality and also of high light gathering power or fast working aperture. This lens should be of a focal length suitably proportioned to the distance of the image formed by the objective "C" and the size of the final image which it is desired to produce on the photographic surface at "F". Except in the case where the self-distributing lineaters are used it is obvious that the traversing action of the displacer T on relay lens R must be so related or synchronized with the action of the distributor at "D" as to yield the desired sequence of image components on the sensitive surface "F".

This sensitive surface shown at "F" is, the emulsion of standard motion picture film and any kind of available film stock may obviously be used according to the nature of the subject and the type of image desired. Obviously this surface might also be the surface of any plate or film of any desired size or nature for making stills or motion pictures.

In the above description the movable mirrors have been referred to as "distributor mirrors" on the assumption that the line of view is from the objective lens toward the object, in which case the line of sight is distributed. If we consider the line of sight in the opposite direction however, the movable mirrors might more properly be described as "assemblying mirrors".

Referring now to Figures 6 and 7, the distributor D and traverser T are moved in timed relation with each other and with a conventional camera mechanism comprising shutter 2 and pull down mechanism 3 in any suitable manner, for example, by being driven from a common power shaft 4. The distributor D is driven from power shaft 4 by any suitable bell crank or link motion 5.

The traverser T is driven from the shaft 4 through the gears 6, and caused to oscillate through the desired angle by the pine and slot connection 7 in Figure 6. Also in this Figure 6 the pin 8 of the connection 7 is directly connected through shaft 9 to the gear 6, whereby the traverser continuously rocks through its angle as above described, to produce a smear type stereogram.

In Figure 7 a pin 10 of the pin and slot connection 11 is mounted on a gear 12 which is connected through a mutilated gear 13 with a shaft 19, whereby the traverser T is moved, step by step, into its various positions, remaining stationary for a substantial part of the time that it is in alinement with each of the distributing mirrors D as above described, to produce an interlined stereogram of the stripe type. Shaft 19 is coupled to shaft 4 through a four to one gear.

The usual motion picture camera construction provides a shaft 14 which makes one complete revolution for one cycle of operation, that is, for exposing one film frame with the shutter open of course, and for closing the shutter while pulling down that film frame to bring the next one in position in the aperture. This shaft 14 is connected with the power shaft 4, through a one to one gear 15.

In Figure 6 the gear 6 is also a one to one ratio. Therefore for one half of a revolution of shaft 4, the distributing mirror D traverses the optical axis while the traverser T is rocked through the desired angle, and while the shutter 2 remains open to expose a film frame, and during the next half revolution of the shaft 4 the parts mentioned recover their positions to the beginning of the cycle. In Figure 7, for one half revolution of shaft 4 the traverser T is moved, step by step, into its four stationary positions in alinement with the four distributing mirrors B1, B2, B3, B4, respectively as above described, and during the next half revolution of the shaft 4 these parts recover their positions to the beginning of the cycle.

Reference will now be made to Figs. 9 to 13, inclusive, for further details of the general considerations disclosed and claimed in my above mentioned co-pending application and which considerations are taken into account here for the production of a motion picture film, the successive frames of which contain stereograms of the successive cinematic phases of a moving object.

It will be understood that use may be made of a film larger or smaller than 35 mm. film and use may be made of a different number of viewing stations than the four stations herein illustrated. In any case, preferably the number of viewing stations is equal to the ratio of the line pitch of screen A to the width of each aperture 22 in the line screen A. In the case illustrated in Figs. 1, 6, 7, and 8 there are four viewing stations, therefore the screen A is illustrated in enlarged form in Figure 9 as having a line pitch which is four times the size of the aperture in the screen. It is understood that the apertures 22 in the screen A are separated by opaque portions 23.

During the photographic process of Figs. 1, 6, and 7 the line screen A may be in the plane of the aerial image of the object produced by the lens C whereby the stripes A', B', C', D' are laid down edge to edge, as illustrated in Figs. 9 and 12, or the screen A may be separated from the plane of that aerial image whereby parallax at the edges of aperture 22 causes adjacent stripes to overlap as in Figure 13, the parallax extending in opposite directions from each edge. In either case the width of each stripe A', B', C', D' is of the order of, or at least equal to five times the average width of the silver grains 24 in the emulsion 25.

Preferably the lineater A and therefore the motion picture film as illustrated in Figs. 9 and 11 should have a line pitch at least 300 lines per inch and less than about 600 lines per inch, that is the film contains between 300 and 600 groups of stripes. A sound track 28 may be provided at the side of the picture frames as in Figure 11.

The adjoining stripes or some of them illustrated in Figure 9 represent image portions having substantially different tone values, the shaded areas 26 of the negative representing substantially brighter tone values than the unshaded areas 27.

It will be apparent therefore that the apparatus above described may be employed to photographically produce upon standard motion picture or other film a motion picture stereogram of a moving object.

The stereogram prepared as above described, may be viewed as suggested by Bessiere by projecting an image thereof onto a screen in register with a line screen. The stereogram of this invention may also be viewed in any other suitable manner.

Having thus described the invention, what is claimed as new and desired to be secured by Letters Patent, is:

1. A system, for the production of interlined parallax panoramagrams of an object, comprising an objective lens, a plurality of stationary reflecting surfaces disposed on opposite sides of the optical axis passing through said lens and said object, a distributor reflector having a plurality of movable reflecting surfaces, each of said plurality of stationary reflecting surfaces reflecting a complete view of said object from a discrete viewpoint to one of said movable reflecting surfaces of said distributor reflector and thence to said objective lens, a lineater having lines and optically associated with said objective lens, means for supporting a light sensitive surface, a refracting element intermediate said lineater and said light sensitive surface for laterally displacing the discrete views received from said objective lens. and means for moving said element about a vertical axis parallel to the lines of said lineater.

2. A system in accordance with claim 1 which comprises means for interconnecting the reflecting surfaces of said distributor reflector with said refracting element for synchronous movement thereof.

ARTHUR W. CARPENTER.